May 11, 1965 L. JACHIMOWICZ ETAL 3,183,300
ELECTRICAL CABLE HAVING A LAMINATED CORRUGATED SHEATH
Filed Feb. 11, 1963 2 Sheets-Sheet 1
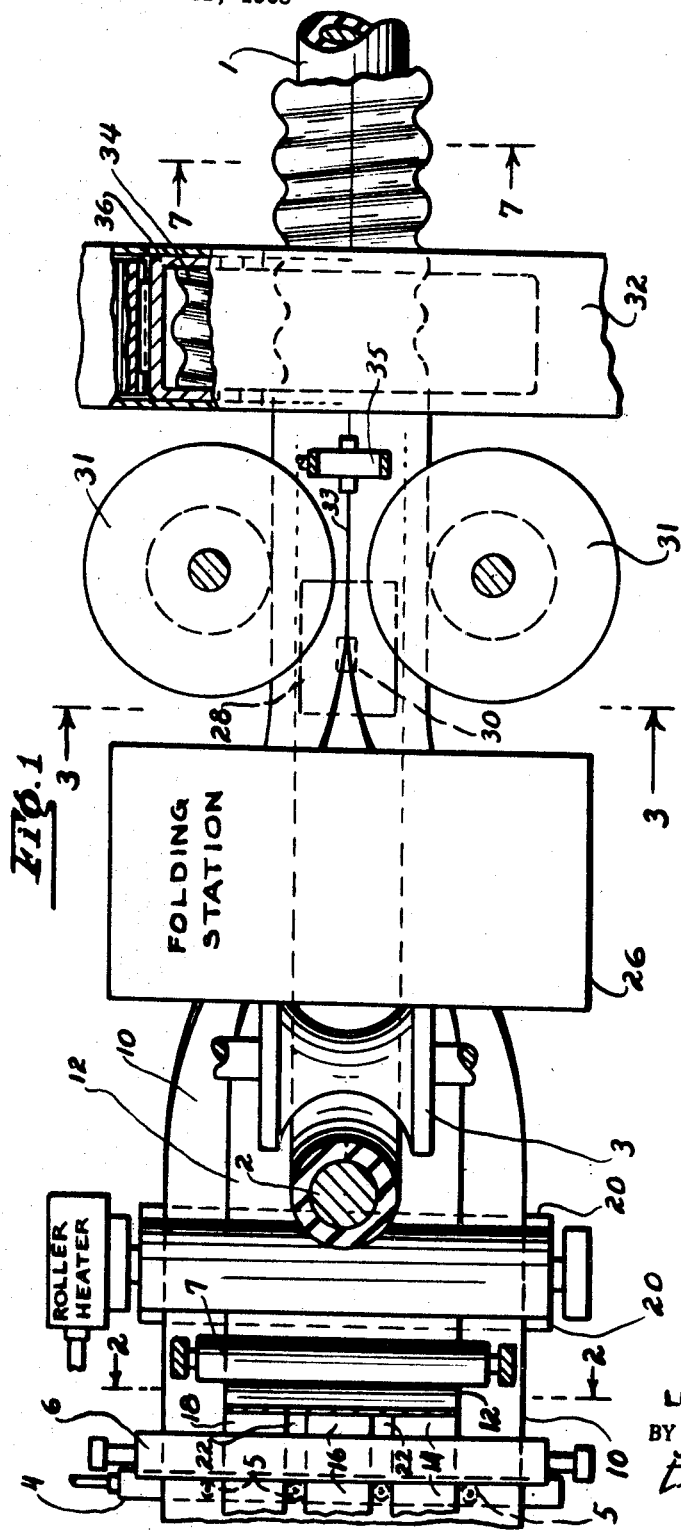
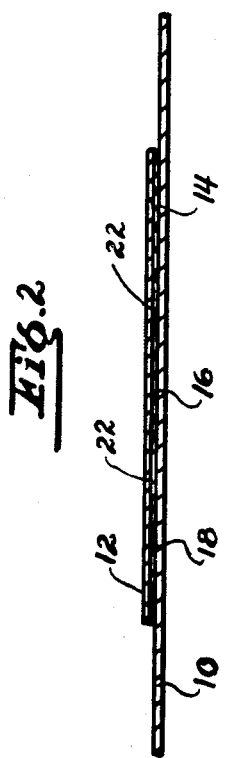
INVENTORS
LUDWIK JACHIMOWICZ
BY JERZY ADAM OLSZEWSKI
ATTORNEYS May 11, 1965    L. JACHIMOWICZ ETAL    3,183,300
ELECTRICAL CABLE HAVING A LAMINATED CORRUGATED SHEATH
Filed Feb. 11, 1963    2 Sheets-Sheet 2
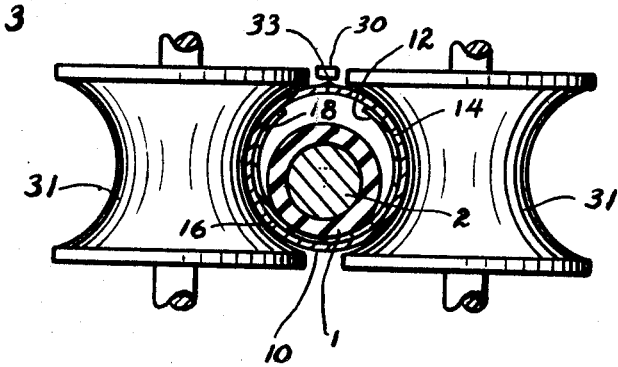
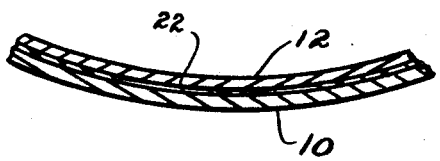
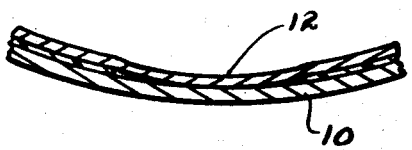
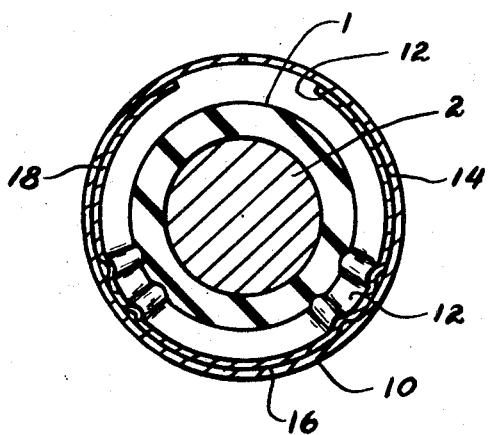
INVENTORS
LUDWIK JACHIMOWICZ
BY JERZY ADAM OLSZEWSKI
ATTORNEYS

United States Patent Office 3,183,300
Patented May 11, 1965

3,183,300
ELECTRICAL CABLE HAVING A LAMINATED CORRUGATED SHEATH
Ludwik Jachimowicz, Elizabeth, and Jerzy Adam Olszewski, Perth Amboy N.J., assignors to General Cable Corporation, New York, N.Y., a corporation of New Jersey
Filed Feb. 11, 1963 Ser. No. 257,505
6 Claims. (Cl. 174—106)

This invention relates generally to electric cables and, more particularly, to an improved welded corrugated composite sheath for telephone cables.

Electric cables as, for example, telephone cables have conventionally incorporated a sheath for protection of the cable. The sheath ideally provides a mechanical barrier preventing the ingress of moisture into the cable core and in addition the cable sheath shields the cable core electrically. The cable core is shielded electrostatically by any metallic envelope which is grounded, and conventionally the sheath is grounded at the time of installation. The sheath must also shield the cable against electromagnetically induced interferences. To do this, the sheath should have a low electrical resistance, so as to present little resistance to the current flowing in the sheath.

Originally, most telephone cable was enclosed in a lead sheath. In recent years, lead sheathing has been abandoned in favor of other types of sheathing, such as the so-called alpeth and stalpeth sheaths.

The alpeth sheathing consisted of a corrugated longitudinally folded conductive metal strip encasing the cable core over which was extruded a polyethylene jacket. Such sheathing was found, however, incapable of providing the necessary resistance to the penetration of moisture over extended periods.

The stalpeth sheath, explained in U.S. Patent No. 2,589,700, consisted of a corrugated longitudinally folded aluminum sheath over which a corrugated longitudinally folded steel sheath was applied. The aluminum sheath had a gap between the edges. The steel sheath had an overlapping edge portion, which overlap was soldered to provide a moisture-impervious barrier.

Such sheaths do, however, have limited mechanical strength. A welded outer sheath was, therefore, developed. In this construction, a strip of flat steel was formed about the cable core. The abutting edges of the formed strip were welded together. By the use of a folded flat strip, welding of the edges without damage to the core was possible since the edges were separated from the core. Subsequently, the steel sheath was corrugated as, for example, by a helical corrugation formed therein, bringing the bottom of the corrugations into contact with the cable core.

Such construction offered the necessary moisture-impervious barrier in a flexible cable construction. However, the steel sheath, when formed of strip stock, the thickness of which was adequate for mechanical protection of the cable core, had an excessively high electrical resistance to provide the desired shielding of the core. Forming the sheath of steel having the thickness sufficient to provide a low resistance path was impractical from cost and handling considerations.

It was, therefore, desirable to introduce a strip of conductive material under the steel sheath to provide the desired low resistance path for induced currents.

Application of a helically wrapped tape of conductive material such as copper or aluminum tape, even if turns are overlapped, cannot efficiently provide the desired low resistance because due to oxidation of the tape the current path will eventually be helical. A longitudinally wrapped flat tape cannot be used due to the adverse effects it has on cable flexibility.

Insertion of a folded corrugated conductive strip under the steel sheath would excessively increase the cable diameter if the corrugations did not match the corrugations of the steel sheath.

Matching of the corrugations of the conductive strip with the corrugations formed in the steel strip, when the steel must be corrugated on the cable to allow welding, is prohibitively expensive of equipment and decrease in production rates.

It is, therefore, one object of this invention to provide an improved corrugated cable sheath for electric cable having an inner strip of highly conductive material and an outer steel strip folded longitudinally over said core and welded.

It is a further object of this invention to provide an improved method for sheathing electric cable with a corrugated sheath having the desired flexibility and electrical resistance.

In accordance with these objects there is provided, in a preferred embodiment of this invention, a sheath for the cable core of electric cables. The sheath is a composite sheath having an inner strip of highly conductive material and an outer steel strip, both folded longitudinally over the core. A gap exists between the edges of the inner strip. The edges of the outer strip abut within the gap and are welded together. The inner strip is bonded to the outer strip along the longitudinal corrugated surface thereof. Thus, both the inner strip and the outer strip are formed with identical mating corrugations. Along narrow longitudinal strips the steel and conductive metal are unbonded to form pressure contacts electrically coupling the steel to the conductive material.

In accordance with the method of this invention, a strip of highly conductive flat metal tape such as aluminum tape is centered over a wider flat strip of steel tape and is bonded firmly thereto over the major portion of the mating surfaces. The bond is omitted from thin portions to form electrical contacts between the steel tape and the conductive strip. The sandwich strip is then formed or folded around the cable core with the conductive strip inwardly and the edges of the steel strip abutting. The abutting edges of the steel strip are then welded together to form a moisture-impervious barrier. The sandwich strip tube is then corrugated as, for example, by forming a continuous helical corrugation along the length of the sheath working the sheath down into contact with the cable core. The bond between the steel strip and the conductive strip ensures that both materials are corrugated simultaneously.

Other objects and advantages of this invention will be pointed out hereinafter in the detailed description of this invention, which may best be understood by reference to the accompanying drawings, of which:

FIG. 1 is a plan view of a cable assembly line, useful in explaining the method of this invention;

FIG. 2 is a section view taken along lines 2—2 of FIG. 1;

FIG. 3 is a section view taken along lines 3—3 of FIG. 1;

FIGS. 4–6 are sectioned views, to enlarged scale of a portion of the sheath in various stages of fabrication; and FIG. 7 is a section view taken along lines 7—7 of FIG. 1.

In FIG. 1, there is shown a cable assembly line in accordance with the present invention in which a fabricated cable 1 having a core 2, such as a telephone cable, is fed into the assembly line by a positioning roller 3 for application of a sheath thereto.

The sheath is a composite sheath comprising a flat steel strip 10 to which is bonded a centered narrower strip 12 of highly conducting material such as aluminum tape to form a sandwich. The aluminum tape must be securely bonded to the steel.

As will be amplified later, the bond between the steel and the conductive strip must be a secure adhesive bond. In general, pressure sensitive adhesives now commercially available cannot provide the desired bonding strength. However, the commercially available thermoplastic adhesives can provide the requisite bond security, and may easily be applied in conventional manner.

For example, thermoplastic material may be spread between the steel and conductive strips just before the nip of pressure rollers which press the two strips into engagement to form the sandwich. At is known, it is advantageous to spread the adhesive by gated nozzles to control both the thickness and width of the applied adhesive.

However, in the manufacture of electric cable, production speeds vary, and, since cable lengths are limited, the lines must be shut down periodically. At such times, the applied adhesive piles up, creating operational problems.

A method which is more compatible with the cable manufacturing uses adhesive in film form. For example, films of the copolymers of polyethylene modified by monomers containing reactive carboxyl groups, such as the film sold by Dow Chemical Company under the designation QX–3623.2, are satisfactory in providing the desired physical and adhesive properties.

While some films may simply be fed between the steel and conductive strips as they enter between heated pressure rolls, most commercially produced film is blown extruded and would wrinkle destroying the precision of bond placement.

For these reasons, it is desirable to heat the steel strip by a heater 4 having gas flame jets 5 to a temperature of about 230° F. Tapes 14, 16 and 18, of a thermoplastic 1 mil in thickness are applied to the hot steel strip and are prebonded thereto by pressure from roller 6. The prebonding temperature is not high enough to melt the film, which would result in shrinkage, but is sufficient to adhere the film to the steel thereby to maintain the film position and dimensions during further processing stages. Longitudinally extending strips 22 are left unbonded as will be explained in detail in subsequent portions of the application.

The aluminum tape is then fed onto the adhesive strips by guiding roll 7.

The composite tape is then folded about the cable 1 in a folding station 26 which incorporates a plurality of forming rollers to gradually form the tape about the cable. Such forming or folding stations are well known and, thus, not illustrated in detail. At the welding station 28, the abutting edges of the tape are welded together in a continuous moisture-impervious weld. This welding is preferably done in an inert atmosphere and may use conventional welding processes such as D.C. current arcs from contact 30 or R.F. types of welding from sliding contacts. The current melts the edges of the tape 10 to weld them together in a continuous, moisture-impervious, longitudinally extending seam 33.

It is well to here note some details of importance. As can be seen from FIG. 3, cable 1 lies at the bottom of the circularly formed composite sheath. Thus, the sheath can be welded without heat damage to the cable itself. Also, the reason for making the aluminum tape narrower than the steel becomes apparent. By this construction, steel can be welded. Unless the conductive material is so formed that the welded seam is aligned with the gap between edges of the aluminum tape, the aluminum will contaminate the weld, preventing proper welding. If necessary, the weld may be trimmed or smoothened at station 35.

The composite sheath is then corrugated in a continuous helical corrugation by station 32 which is provided with working rollers 34 in a rotatable cage 36 to indent the sheath in a continuous helical corrugation. Such stations are not illustrated in detail but are known to the art as, for example, in the disclosure of U.S. Patent No. 2,525,300 in FIGS. 8, 9 and 10 thereof.

Since the aluminum strip 10 is bonded to the steel strip 12, it will be corrugated simultaneously with corrugation of the steel strip thereby to provide a sandwich having an inner highly conductive strip and an outer steel strip. In order to provide smooth simultaneous corrugations in both layers, the bonding inbetween must be secure in order to transmit forming pressures to the inner tape through the interfacial bond.

For example, if the two tapes are allowed to slip relative one to the other, the inner tape will wrinkle during corrugation. Additionally, if the tapes are allowed to slide one relative to the other, the aluminum tape edge might work its way around to coincide with the abutting edges of the steel tape. The presence of two dissimilar metals in the weld zone would, of course, have a deleterious effect on the welding.

It is desirable that the bond between the aluminum and the steel be of such nature that the shear strength of the bond is equal to the tensile strength of the aluminum. This preferred construction results in a smooth, even corrugation of the aluminum tape inside the steel tape, working the aluminum through the steel without direct contact with the corrugating rolls. Thus, the shear strength of the adhesive measured on a section one inch wide and one-quarter inch deep should be not less than 40 pounds and preferably should exceed 85 pounds (corresponding to the tensile strength of the aluminum). For this reason, I have found it desirable to utilize a thermoplastic adhesive in preference to other types of bonding such as the double-faced pressure sensitive adhesive tapes commercially available. Other bonding agents may, of course, be used if they fulfill the bond strength requirements set forth above.

These figures are given for aluminum tape 8 mils in thickness. When so bonded to a steel tape 12 mils in thickness, a smooth, unwrinkled corrugation of the aluminum can be achieved inside the corrugated steel.

Since the adhesive layer is an insulator and since it is desirable to provide electrical contact between the steel and the aluminum, the longitudinally extending narrow unbonded strips 22 are provided. The strip may, for example, be a quarter-inch gap and two may be provided in a two-inch diameter sheath. As illustrated in FIGS. 2 and 4–6, it can be seen that a compression contact is formed between the aluminum and the steel in the unbonded strips. The one-quarter inch gap in the bond is shown in FIG. 2 before forming of the cylindrical tube. As the composite sheath is formed to a cylindrical tube, the width of the unsupported section will be shortened since it will be part of a circle of smaller diameter as shown in FIG. 4. As the diameter is reduced, the aluminum tape will buckle in beam failure making contact between the steel and the aluminum as shown in FIG. 5. When the contact between the steel and the aluminum is established, the buckling of the aluminum will be stopped and the excess aluminum material will be bent as shown in FIG. 6. Part of the deformation shown in this figure is permanent and part remains elastic. In this way, a pressure contact between the two materials is achieved and the contact resistance between aluminum and steel sheaths is in the range of .10–1.0 milliohms per foot of sheath. It is convenient to omit an axially extending strip of bonding agent when polyethylene tape is used. However, it is, of course, entirely feasible to provide such electric contact at axially displaced intervals instead of continuous contact as illustrated in the preferred embodiment. It is possible also to make the adhesive conductive by dispersion in it of carbon or metallic particles.

In this manner, there is achieved a sheath shown in section in FIG. 7 which has the desired mechanical strength, water imperviousness and flexibility with the desired electrical resistivity with metals of easily handled thickness. For example, the 8 mil thick aluminum strip bonded to a 12 mil thick steel strip will provide the required low electrical resistance in ranges of cables from a one-half inch to two and one-half inches. The method of fabricating is economical since little additional equipment is needed and is compatible with the manufacturing speeds and assembly processing for modern cables such as telephone cable.

The method of sheathing electrical cable disclosed herein is the subject of applicants' divisional application filed April 8, 1964, Serial No. 358,273.

This invention may be variously modified and embodied within the scope of the subjoined claims.

What is claimed is:

1. An electric cable comprising a laminated cable core, a corrugated sheath over said core, said sheath comprising an inner strip of highly conductive metal and an outer steel strip bonded together and folded longitudinally over said core, said inner strip being of such width as to form a longitudinally extending gap between the longitudinal edges of the folded strip, said folded steel strip having its longitudinal edges abutting and positioned in said gap and with said abutting edges welded together to form a water barrier, said highly conductive strip and said steel strip being in electrical contact, said highly conductive strip and said steel strip being bonded together over a major portion of the mating surfaces, which bonded portions include the mating surfaces at the edges of said highly conductive strip.

2. An electric cable in accordance with claim 1 comprising a corrugated sheath in which said sheath is provided with at least one longitudinally extending strip along which said conductive strip and said steel strip are in positive pressure electric contact.

3. An electric cable in accordance with claim 1 comprising a corrugated sheath in which said corrugations are formed helically in said sheath.

4. An electric cable in accordance with claim 1 comprising a corrugated sheath in which said bond has a shear strength sufficient to prevent relative displacement of metal tapes during tube forming and corrugating.

5. An electric cable in accordance with claim 1 comprising a corrugated sheath in which said conductive strip is aluminum.

6. A laminated helically corrugated sheath for an electric cable comprising an outer steel strip folded longitudinally into a tube with the abutting longitudinal edges of said strip welded together in a longitudinally extending seam to form a moisture-impervious barrier, a narrower strip of highly conductive material within said steel sheath, said highly conductive strip being folded longitudinally into a tube with the longitudinal edges thereof separated from each other and from said seam so that the seam is within the gap between edges of said conductive strip, said laminated sheath being helically corrugated and said highly conductive strip being contiguous and tightly bonded to said steel sheath along the entire convoluted surface of said highly conductive sheath, and means for electrically coupling said highly conductive strip to said steel sheath.

References Cited by the Examiner

UNITED STATES PATENTS

| 2,063,470 | 12/36 | Staples | 29—474.1 |
| 2,088,446 | 7/37 | Specht | 29—474.1 |
| 2,259,850 | 10/41 | Zundorf | 174—106 |
| 2,308,274 | 1/43 | Frederickson | 174—106 |
| 2,589,700 | 3/52 | Johnstone | 174—109 X |

LARAMIE E. ASKIN, *Primary Examiner.*

JOHN P. WILDMAN, *Examiner.*

UNITED STATES PATENT OFFICE
CERTIFICATE OF CORRECTION

Patent No. 3,183,300                                May 11, 1965

Ludwik Jachimowicz et al.

It is hereby certified that error appears in the above numbered patent requiring correction and that the said Letters Patent should read as corrected below.

Column 3, line 16, for "At" read -- As --; column 5, line 21, strike out "laminated" and insert the same before "corrugated", in line 22, same column 5.

Signed and sealed this 21st day of September 1965.

(SEAL)
Attest:

ERNEST W. SWIDER
Attesting Officer

EDWARD J. BRENNER
Commissioner of Patents